(12) United States Patent
Blos et al.

(10) Patent No.: US 7,725,229 B2
(45) Date of Patent: May 25, 2010

(54) METHOD AND DEVICE FOR DETECTING A ROLLOVER SITUATION OF A MOTOR VEHICLE

(75) Inventors: Armin Blos, Donaustauf (DE); Jochen Bonitz, Bad Abbach (DE); Tomomi Yano, Kawasaki (JP)

(73) Assignee: Siemens AG, Munich (DE)

( * ) Notice: Subject to any disclaimer, the term of this patent is extended or adjusted under 35 U.S.C. 154(b) by 829 days.

(21) Appl. No.: 11/596,133

(22) PCT Filed: Jun. 16, 2005

(86) PCT No.: PCT/EP2005/052788

§ 371 (c)(1),
(2), (4) Date: Nov. 9, 2006

(87) PCT Pub. No.: WO2005/123463

PCT Pub. Date: Dec. 29, 2005

(65) Prior Publication Data

US 2007/0185632 A1 Aug. 9, 2007

(30) Foreign Application Priority Data

Jun. 16, 2004 (DE) .................. 10 2004 029 064

(51) Int. Cl.
*B60R 21/01* (2006.01)
(52) U.S. Cl. ..................................... 701/45
(58) Field of Classification Search ............... None
See application file for complete search history.

(56) References Cited

U.S. PATENT DOCUMENTS

| | | | |
|---|---|---|---|
| 4,985,835 A | | 1/1991 | Sterler et al. |
| 6,002,975 A | * | 12/1999 | Schiffmann et al. ......... 701/36 |
| 6,259,999 B1 | | 7/2001 | Pantle |
| 6,282,474 B1 | | 8/2001 | Chou et al. |
| 6,618,655 B2 | | 9/2003 | Tobaru et al. |
| 6,618,656 B2 | | 9/2003 | Kueblbeck et al. |
| 6,625,564 B2 | | 9/2003 | Mattes et al. |
| 6,650,971 B2 | | 11/2003 | Haas |
| 6,687,576 B2 | * | 2/2004 | Mattes et al. .............. 701/1 |
| 6,701,276 B2 | | 3/2004 | Kueblbeck et al. |
| 6,732,034 B2 | | 5/2004 | Hambsch et al. |
| 6,796,397 B2 | | 9/2004 | Lahmann et al. |
| 7,017,700 B2 | | 3/2006 | Frimberger et al. |
| 2002/0075140 A1 | * | 6/2002 | Yeh et al. ................ 340/438 |
| 2002/0173882 A1 | | 11/2002 | Tobaru et al. |
| 2003/0047927 A1 | | 3/2003 | Frimberger et al. |
| 2003/0182042 A1 | | 9/2003 | Watson et al. |
| 2004/0002802 A1 | | 1/2004 | Ide et al. |

(Continued)

FOREIGN PATENT DOCUMENTS

DE 196 51 124 C1 5/1998

(Continued)

*Primary Examiner*—Michael J. Zanelli
(74) *Attorney, Agent, or Firm*—Laurence A. Greenberg; Werner H. Stemer; Ralph E. Locher

(57) ABSTRACT

A rate of rotation around the longitudinal axis of a motor vehicle and the lateral inclination thereof are determined as state variables. A rollover situation is detected when the state variables are greater than the characteristic curve of a minimum triggering threshold in a surface plane defined by the state variables.

8 Claims, 2 Drawing Sheets

U.S. PATENT DOCUMENTS

2005/0209757 A1 9/2005 Kueblbeck et al.

FOREIGN PATENT DOCUMENTS

| | | |
|---|---|---|
| DE | 197 32 081 A1 | 1/1999 |
| DE | 100 10 633 A1 | 9/2001 |
| DE | 100 19 417 A1 | 10/2001 |
| DE | 100 25 260 A1 | 12/2001 |
| DE | 100 25 259 A1 | 1/2002 |
| DE | 101 12 315 A1 | 1/2002 |
| DE | 101 25 871 C2 | 2/2002 |
| DE | 101 06 181 C1 | 8/2002 |
| DE | 101 15 217 C1 | 8/2002 |
| DE | 101 23 215 A1 | 12/2002 |
| DE | 102 21 466 A1 | 12/2003 |
| EP | 0 327 853 A1 | 8/1989 |
| EP | 0 934 855 B1 | 8/1999 |
| EP | 1 346 883 A2 | 9/2003 |
| EP | 1 349 883 A2 | 9/2003 |
| EP | 1 502 823 A1 | 2/2005 |
| WO | WO 00/58133 | 10/2000 |
| WO | WO 03/010034 A1 | 2/2003 |

* cited by examiner

METHOD AND DEVICE FOR DETECTING A ROLLOVER SITUATION OF A MOTOR VEHICLE

BACKGROUND OF THE INVENTION:

Field of the Invention

The invention relates to a method and a device for detecting a rollover situation in the case of a motor vehicle.

Motor vehicles are being equipped with more and more passive restraint systems, such as, for example, seatbelt pretensioners, side-curtain air bags, head airbags and frontal airbags. Reliable detection of an accident situation which necessitates the use of the respective means of restraint is important for the safety of the respective vehicle occupants. It must also be ensured that incorrect deployments of the restraint means are avoided as far as possible in order to avoid repairs which then become necessary.

An accident situation that is particularly dangerous for vehicle occupants is a rollover of the vehicle about its longitudinal axis.

A method for activating a safety system protecting the occupants in a motor vehicle is known from EP 0 327 853 B1. A warning signal describing the forward displacement of the occupants of the vehicle is derived from a signal from an acceleration sensor by double integration. Toward that end, a path or distance that occupants will have traveled relative to the vehicle at a time lying in the future is predicted. Said path is composed of the distance already traveled from the initial position to the current time, the velocity, the further acceleration, and the first derivation of the acceleration according to time. These values are each weighted using appropriate factors and integrated in time. A direction-dependent forward displacement is determined through corresponding taking into consideration of measurement signals from acceleration sensors which on the one hand sense the longitudinal acceleration and on the other hand the lateral acceleration. Depending on the anticipated forward displacement, a corresponding restraint means is then activated, that is to say, for example, that an airbag is triggered.

SUMMARY OF THE INVENTION

The object of the invention is to provide a method and a device for detecting a rollover situation of a vehicle which allow robust and reliable detection of the rollover situation.

The invention is characterized by a method and a corresponding device for detecting a rollover situation of a vehicle, wherein a rate of rotation about a longitudinal axis of the vehicle and a pitch of the vehicle in the lateral direction are determined as state variables. For this purpose suitable sensors are preferably disposed in the vehicle, it being possible to determine the rate of rotation and the pitch as a function of the measurement signals of said sensors. A rollover situation is detected if the state variables exceed an activation threshold characteristic in the state space spanned by said state variables. Reliable detection of a plurality of different rollover situations is thus easily possible also in cases which differ from typical test rollover situations. Typical rollover situations, in this context, are understood as meaning predefined accident scenarios, such as, for example, the sideways drifting of the vehicle into soft soil or the lateral impact with a curb. In this way a robust and reliable detection of rollover situations can be guaranteed. Simple calibration is also possible.

In an advantageous embodiment of the invention the activation threshold characteristic runs linearly in the state space between a dynamic and a static roll point. The respective activation threshold is characteristic of the roll energy which is necessary at the respective point of the state space in order to cause a rollover of the vehicle. The static roll point is the point at which the rollover is provoked essentially on account of the potential energy of the vehicle. The dynamic roll point is the point at which the rollover of the vehicle is caused essentially by the kinetic energy of the vehicle. Due to the linear progression between the static and the dynamic roll point of the characteristic of the activation threshold characteristic the latter is embodied very simply and nonetheless represents very precisely the respective situations in which a rollover of the vehicle is to be expected.

According to a further advantageous embodiment of the invention the pitch of the vehicle is predicted. In this way a particularly early detection of an imminent rollover of the vehicle is possible, which has the advantage that sufficient time may be available in order to activate corresponding restraint means in a suitable manner.

In this connection it is advantageous if the pitch is predicted as a function of a sensed lateral or vertical acceleration of the vehicle. In this way a high quality of prediction can be achieved.

According to a further advantageous embodiment of the invention the rate of rotation is predicted. In this way a particularly early detection of an imminent rollover of the vehicle is possible, which has the advantage that sufficient time may be available in order to activate corresponding restraint means in a suitable manner.

In this connection it is also advantageous if the rate of rotation is predicted as a function of a sensed lateral and/or vertical acceleration of the vehicle. Vertical acceleration, in this context, is understood as meaning an acceleration in the direction of the vertical axis of the vehicle. Lateral acceleration, in this context, is understood as meaning an acceleration in the direction of the lateral axis of the vehicle. In this way a high quality of prediction can easily be guaranteed.

According to a further advantageous embodiment of the invention, when a typical rollover situation is detected, one of the state variables is corrected such that the activation threshold characteristic is exceeded. As a result it can easily be ensured that typical rollover situations reliably lead to an activation of the respective restraint means.

According to a further advantageous embodiment of the invention, a plausibility check is performed as a function of the sensed lateral and/or vertical acceleration of the vehicle as a further precondition that the rollover situation is finally detected. In this way it is easily possible to reduce the probability that a rollover situation is detected erroneously.

According to a further advantageous embodiment of the invention the pitch is determined as a function of the rate of rotation. This can be achieved particularly easily by means of integration of the rate of rotation. Thus, the state variables can be determined by means of a small number of sensors, preferably only one sensor.

BRIEF DESCRIPTION OF THE DRAWINGS

Exemplary embodiments of the invention are explained below with reference to the schematic drawings, in which.

DESCRIPTION OF THE PREFERRED EMBODIMENTS

Figure 1:
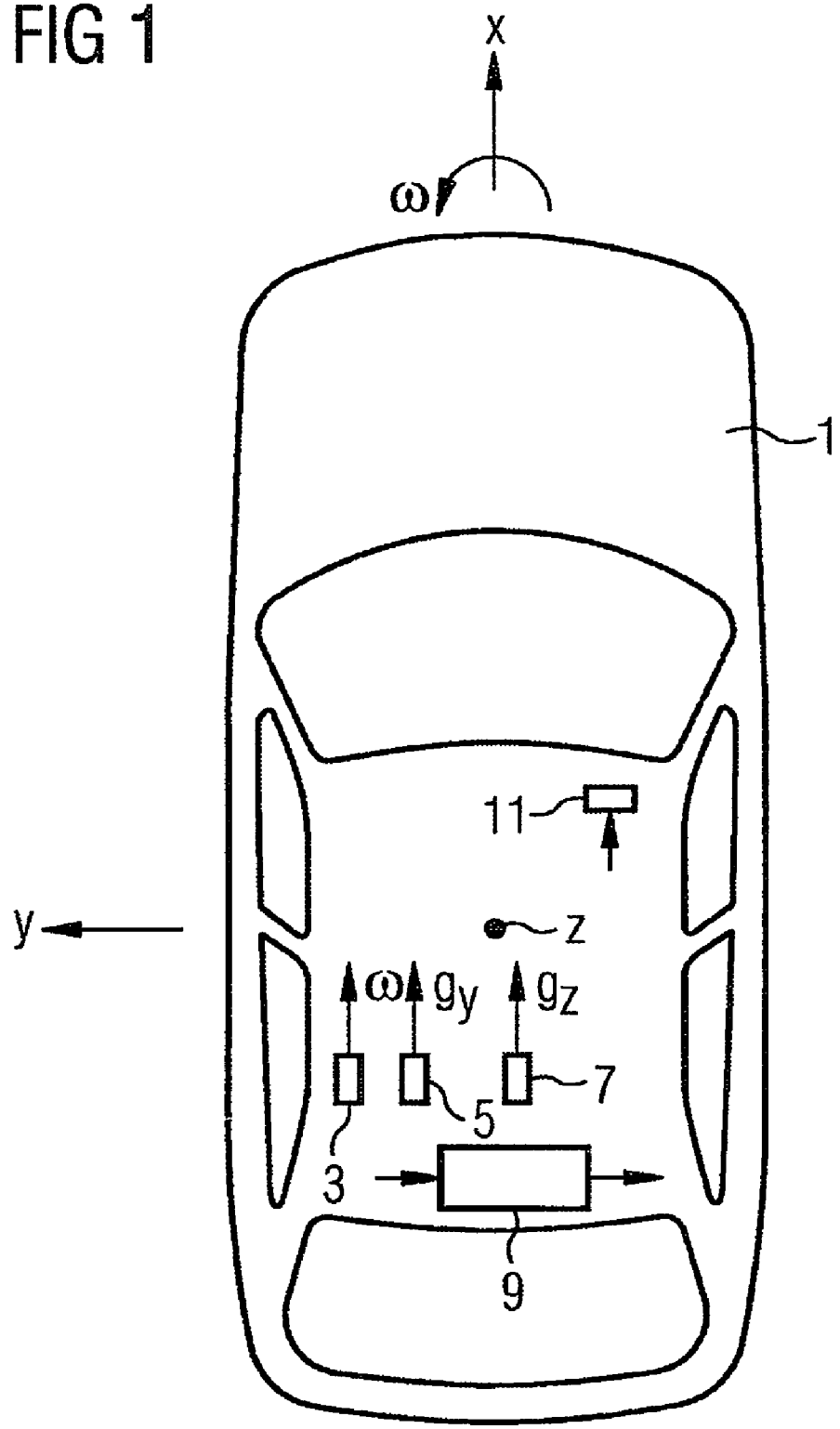
FIG. 1 shows a vehicle having a device for detecting a rollover situation.

A vehicle 1 (FIG. 1), more particularly a motor vehicle, has a longitudinal axis x, a lateral axis y and a vertical axis z. A rate of rotation ω is an angular velocity of a rotation about the vehicle longitudinal axis x.

In the vehicle there is preferably disposed a rate of rotation sensor 3 which senses the rate of rotation ω. Alternatively the rate of rotation ω can also be determined by means of other suitable measurement variables.

Also provided is a first acceleration sensor 5 which senses a lateral acceleration $g_y$. Also provided is a second acceleration sensor 7 which senses a vertical acceleration $g_z$. Also disposed in the vehicle is a control device 9 which is embodied to detect a rollover situation in the case of the vehicle 1 as a function of the measurement signals of the sensors and which is also embodied for correspondingly controlling one or more actuators 11 for activating one or more passive restraint means such as, for example, one or more seatbelt pretensioners, one or more side-curtain airbags, head airbags or also other airbags.

Figure 2:
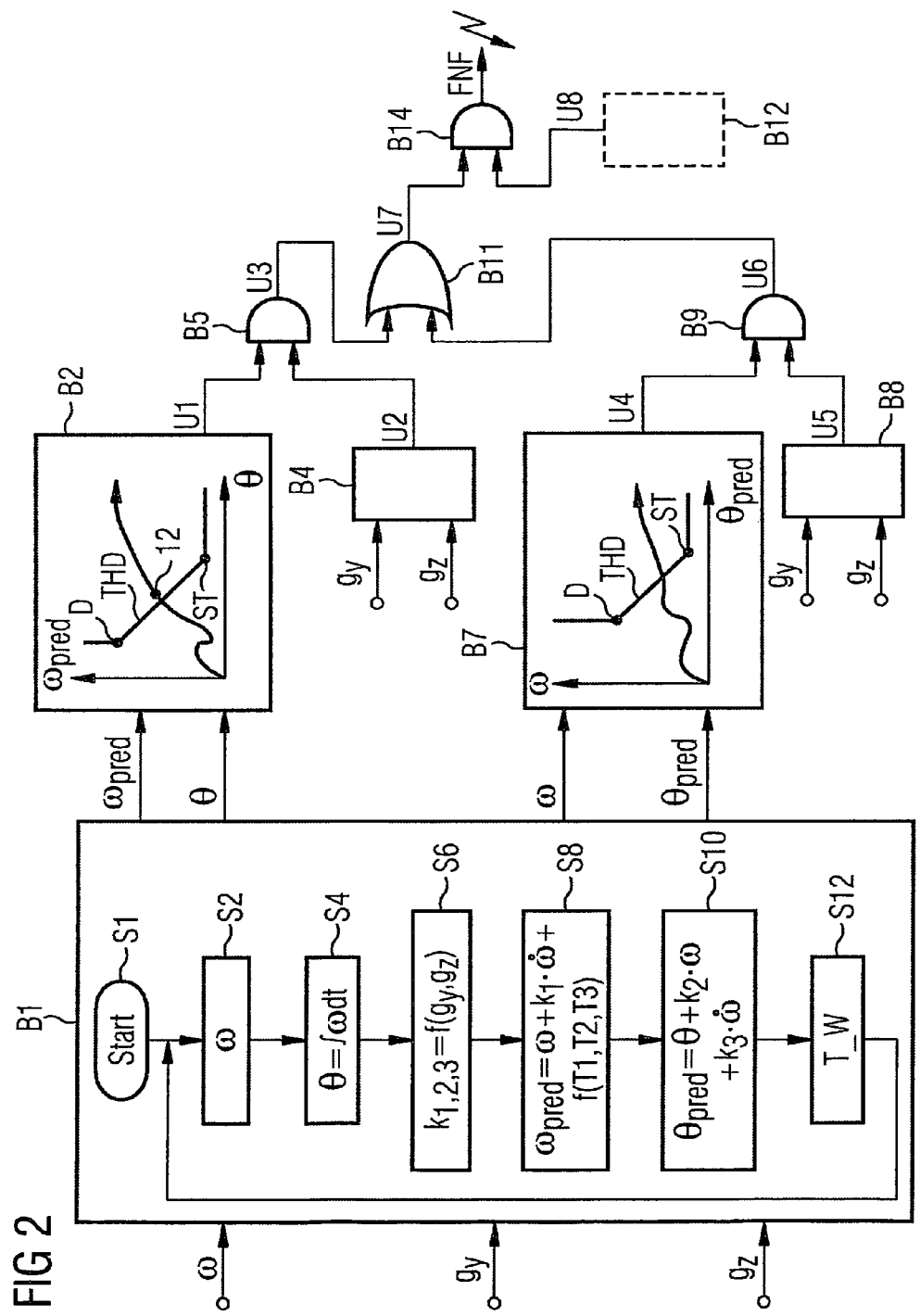
FIG. 2 is a block diagram of the device for detecting the rollover situation.

The control device 9 is explained in more detail below with reference to the block diagram shown in FIG. 2 with regard to the detection of the rollover situation.

The rate of rotation ω, the lateral acceleration $g_y$ and the vertical acceleration $g_z$ are supplied as input variables to a block B1. Block B1 comprises a program which is stored in the control device and loaded and processed during the operation of the vehicle. The program is started in a step S1 in which variables are initialized if applicable.

The rate of rotation ω is determined in a step S2. This is preferably accomplished by means of a corresponding sampling of the measurement signal from the rate of rotation sensor 3.

In a step S4, a pitch Θ of the vehicle 1 in the lateral direction is determined. If no separate sensor is provided for this purpose, the calculation can easily be performed with sufficient precision by integrating the rate of rotation ω over time.

In a step S6, a first and/or second and/or third correction factor $k_1$, $k_2$, $k_3$ are determined. The correction factors can be predefined as fixed values, but can also be dependent on the lateral acceleration $g_y$ and/or the vertical acceleration $g_z$. Determining the first to third correction factors $k_1$, $k_2$, $k_3$ as a function of the lateral acceleration $g_y$ and/or the vertical acceleration $g_z$ is preferably accomplished by means of a characteristic map which has been determined in advance by corresponding tests with the vehicle or by means of simulations. Alternatively, however, the assignment can also be made by means of a corresponding analytical function.

A predicted rate of rotation $\omega_{pred}$ is determined in a step S8. This is preferably carried out according to the formula specified in step S8. $\dot{\omega}$ designates the temporal derivation of the rate of rotation ω. T1, T2, T3 denote terms for test rollover situations. Such test rollover situations are typical rollover situations which are predefined for specific cases. Thus, a first term T1, for example, is characteristic of a sideways sliding away of the vehicle 1 into soft soil. In this case the vertical acceleration $g_z$ is initially equal to zero and the lateral acceleration $g_y$ has a virtually constant value and at the start the rate of rotation ω also has a low value. If, however, the vertical acceleration $g_z$, the lateral acceleration $g_y$ and the rate of rotation ω have corresponding characteristic shapes, a rollover is to be expected in this situation and the first term T1 is assigned a characteristic value.

An example of a second term is the lateral collision with a curb or a similar obstacle. In this case the rate of rotation ω is still virtually zero even if a very strong lateral acceleration $g_y$ is nonetheless already present. In this case the second term T2 is then set to a characteristic value. An example of a third term is a situation in which the vehicle 1, for example, mounts a ramp with one and then two wheels on one side of the vehicle, as may be the case, for example, with a crash barrier on a road. In this case the vehicle 1 initially experiences a strong acceleration in the direction of its vertical axis, in other words a vertical acceleration $g_z$, and the rate of rotation ω increases only thereafter. When corresponding values for the rate of rotation ω and the vertical acceleration $g_z$, the third term is then set to a corresponding characteristic value.

If at least one of the terms T1-T3 has a characteristic value, when the predicted rate of rotation $\omega_{pred}$ is being determined a predefinable high supplementary value is added to the actual predicted rate of rotation $\omega_{pred}$. Depending on the embodiment of the control device 9, the terms T1-T3 can be taken into account accordingly or not during the determination of the predicted rate of rotation $\omega_{pred}$. The terms T1-T3 are preferably taken into account in step S8 when the predicted rate of rotation $\omega_{pred}$ is determined.

A predicted pitch $\Theta_{pred}$ is determined in a step S10. This calculation is preferably carried out with the aid of the formula specified in step S10. By taking into account the product from the third correction factor $k_3$ and the temporal derivation $\dot{\omega}$ of the rate of rotation ω it is possible to make a particularly good prediction of the pitch Θ. In a simple embodiment it is, however, also possible to omit taking this product into account.

In a step S12, the program then pauses for a predefinable waiting time period T_W, which may be, for example, 1 ms, before the processing in step S2 is resumed once more. During the waiting time period T_W other functions are preferably processed in the control device 9. In a particularly simple embodiment of the program, steps S6 to S10 can also be omitted or one or more of steps S6 to S10 can be omitted.

A block B2 has the predicted rate of rotation $\omega_{pred}$ and the pitch Θ as input variables. The predicted rate of rotation $\omega_{pred}$ and the pitch Θ form state variables and span a state space. An activation threshold characteristic THD runs linearly between a static and a dynamic roll point ST, D. Starting from the static roll point ST to further increasing pitches Θ, it has a virtually constant, in particular a constant, shape in relation to the predicted rate of rotation $\omega_{pred}$. Starting from the dynamic roll point D to further increasing values of the predicted rate of rotation $\omega_{pred}$, it has a virtually constant, in particular a constant, shape in relation to the pitch Θ. A first rollover flag U1 is set if the state variables exceed the activation threshold characteristic THD. This is the case for example at a point 12. A first quadrant of the state space is shown in block B2. The same applies analogously to a third quadrant of the state space, in which both the pitch Θ and the predicted rate of rotation $\omega_{pred}$ have negative signs.

Also provided is a block B4 whose input variables are the vertical acceleration $g_z$ and the lateral acceleration $g_y$. A plausibility value for detection of a rollover situation is determined in block B4 and then, if the plausibility value indicates a potential rollover situation, sets a second rollover flag U2 at the output of block B4. A block B5 is an AND element at whose output a third rollover flag U3 is set if both the first and the second rollover flags U1, U2 are set. The inputs of block B5 can be hold elements with an adjustable hold time which retain a setting of the first or, as the case may be, second rollover flags for the adjustable hold time as input values of the AND element.

A block B7 is also preferably provided whose input variables are the rate of rotation ω and the predicted pitch $\Theta_{pred}$.

Block B7 is embodied similarly to block B2, with only the input variables being modified as appropriate. Accordingly, block B7 is embodied for setting a fourth rollover flag U4 if its state variables exceed the activation threshold characteristic THD.

Also provided is a block B8 in which a plausibility check of the rollover situation corresponding to block B4 is performed and, dependent on the result thereof, a fifth rollover flag U5 is set if the rollover situation is plausible. A block B9 is an AND element at whose output a sixth rollover flag U6 is set if both the fourth and the fifth rollover flags U4 and U5 are set on the input side. Corresponding hold elements can also be provided here on the input side.

A block B11 is OR element at whose output a seventh rollover flag U7 is set if at least one of the third or sixth rollover flags U3, U6 is set. A block B12 represents a possibly redundantly present control device which is provided for safety purposes and which sets an eighth rollover flag U8 if it likewise detects the rollover situation. The redundant control device is preferably identical in structure to the system shown in the block diagram of FIG. 2. If both the seventh and the eight rollover flags U7, U8 are present at block B14, an actuating signal FNF is generated for the actuator 11, which then leads for example to the triggering of a side-curtain airbag. Where appropriate the control device 9 may also comprise only one of the paths formed by the blocks B2, B4, B5 or, as the case may be, B7, B8, B9.

We claim:

1. A method of detecting a rollover situation of a vehicle, which comprises:
   determining state variables including a rate of rotation about a longitudinal axis of the vehicle and a pitch angle of the vehicle in a lateral direction thereof;
   predicting the rate of rotation as a function of at least one of a sensed lateral acceleration and a sensed vertical acceleration of the vehicle; and
   detecting a rollover situation if the state variables exceed an activation threshold characteristic in a state space spanned by the state variables.

2. The method according to claim 1, which comprises defining an activation threshold characteristic to run linearly between a dynamic roll point and a static roll point in the state space.

3. The method according to claim 2, which comprises predicting the pitch angle of the vehicle.

4. The method according to claim 3, which comprises predicting the pitch angle as a function of at least one of a sensed lateral acceleration and a sensed vertical acceleration of the vehicle.

5. The method according to claim 2, which comprises, when performing the step of detecting a rollover situation, correcting one of the state variables such that the activation threshold characteristic is exceeded.

6. The method according to claim 2, which comprises performing a plausibility check in dependence on at least one of a sensed lateral acceleration and a sensed vertical acceleration of the vehicle, and introducing the plausibility check as a further precondition that the rollover situation is finally detected.

7. The method according to claim 2, which comprises determining the pitch angle as a function of the rate of rotation.

8. A device for detecting a rollover situation of a vehicle, the device comprising:
   means for determining state variables of the vehicle including a rate of rotation of the vehicle about a longitudinal axis thereof and a pitch of the vehicle in a lateral direction, wherein the means for determining state variables predicts the rate of rotation as a function of at least one of a sensed lateral acceleration and a sensed vertical acceleration of the vehicle; and
   means for detecting a rollover situation if the state variables of the vehicle exceed an activation threshold characteristic in a state space spanned by the state variables.

* * * * *